United States Patent
Eckert et al.

(10) Patent No.: US 11,704,875 B2
(45) Date of Patent: Jul. 18, 2023

(54) METHOD FOR ARRANGING FUNCTIONAL ELEMENTS IN A ROOM

(71) Applicant: BULTHAUP GMBH & CO. KG, Bodenkirchen (DE)

(72) Inventors: Marc Oliver Eckert, Bodenkirchen (DE); Roger Paul Rieger, Landshut (DE); Ulrich Spohde, Bodenkirchen (DE)

(73) Assignee: BULTHAUP GMBH & CO. KG, Bodenkirchen (DE)

( * ) Notice: Subject to any disclaimer, the term of this patent is extended or adjusted under 35 U.S.C. 154(b) by 0 days.

(21) Appl. No.: 17/047,061

(22) PCT Filed: Apr. 16, 2019

(86) PCT No.: PCT/EP2019/059844
§ 371 (c)(1),
(2) Date: May 18, 2021

(87) PCT Pub. No.: WO2019/201952
PCT Pub. Date: Oct. 24, 2019

(65) Prior Publication Data
US 2021/0272366 A1    Sep. 2, 2021

(30) Foreign Application Priority Data

Apr. 16, 2018 (DE) ............ 10 2018 108 991.0

(51) Int. Cl.
*G06T 19/00* (2011.01)
*G06T 17/10* (2006.01)

(52) U.S. Cl.
CPC ............ *G06T 19/006* (2013.01); *G06T 17/10* (2013.01); *G06T 2210/04* (2013.01); *G06T 2210/56* (2013.01); *G06T 2219/2004* (2013.01)

(58) Field of Classification Search
CPC ....... G06T 19/00; G06T 19/006; G06T 17/10; G06T 2210/04; G06T 2210/56;
(Continued)

(56) References Cited

U.S. PATENT DOCUMENTS

2002/0032546 A1* 3/2002 Imamura ................ G06F 30/13
703/1
2002/0107674 A1* 8/2002 Bascle .................... G06F 3/011
703/1
(Continued)

FOREIGN PATENT DOCUMENTS

WO       2016154312 A1    9/2016

OTHER PUBLICATIONS

NPL Video Titled "Complete ProKitchen Design in 20 Minutes!", published Sep. 18, 2014—available for viewing at: https://www.youtube.com/watch?v=Nimk94u--BA; select screenshots included. (Year: 2014).*
(Continued)

*Primary Examiner* — Daniel F Hajnik
(74) *Attorney, Agent, or Firm* — McCoy Russell LLP

(57) ABSTRACT

The present invention relates to a method for arranging one or more functional elements in a room, comprising the steps of: a) three-dimensional acquisition of the room or of a part of the room by means of a scanner, b) definition of a grid based on the acquisition according to step a), c) definition of grid points of the room in the grid established according to step b), d) definition of at least one grid point of one or more functional elements, and e) virtual arrangement of the one or more functional elements in the room at at least one location, at which at least one grid point of the room and at least one grid point of the functional element coincide.

16 Claims, 5 Drawing Sheets

(58) Field of Classification Search
CPC . G06T 2219/2004; G06F 30/00; G06F 30/10; G06F 30/12; G06F 30/13
See application file for complete search history.

(56) References Cited

U.S. PATENT DOCUMENTS

| | | | |
|---|---|---|---|
| 2005/0012740 A1* | 1/2005 | Takahashi | G06T 15/00 345/419 |
| 2016/0179336 A1* | 6/2016 | Ambrus | G02B 27/017 715/768 |
| 2017/0069142 A1* | 3/2017 | Elmekies | G06K 9/6202 |
| 2017/0256097 A1 | 9/2017 | Finn et al. | |
| 2018/0225885 A1* | 8/2018 | Dishno | G06F 16/9577 |
| 2019/0250791 A1* | 8/2019 | Hong | G06F 3/04815 |

OTHER PUBLICATIONS

NPL Video Titled "20-20 Integrated Wardrobe Solution: Optima", published Sep. 27, 2009—available for viewing at: https://www.youtube.com/watch?v=FS6aXam0_TA; select screenshots included. (Year: 2009).*

NPL Video Titled "ProKitchen 8.1.8—Advanced Snap", published Jul. 25, 2016, available for viewing at: https://www.youtube.com/watch?v=KrGp-emEN28; select screenshots included. (Year: 2016).*

NPL Video Titled "Complete ProKitchen Design in 20 Minutes!" with additional screenshots at 2:21, 2:19, and 10:37, published Sep. 18, 2014, available for viewing at: https://www.youtube.com/watch?v=Nimk94u--BA; (Year: 2014).*

NPL Video titled "Corel Draw Tips & Tricks Grid Lines" by Doug Green, published Oct. 16, 2017, available for viewing at: https://www.youtube.com/watch?v=F3n0eFHtzQE, selected screen shots included. (Year: 2017).*

"InsideAR: Metaio zeigt wie man in Sekunden einen Raum in 3D scannt" YouTube Website, Available Online at https://www.youtube.com/watch?v=5pMZIoYr3q8, Oct. 29, 2014, 8 pages.

"HottScan—3D room survey in 2 minutes," YouTube Website, Available Online at https://www.youtube.com/watch?v=KUdbrFOJIO0, Jan. 12, 2018, 2 pages.

ISA European Patent Office, International Search Report Issued in Application No. PCT/EP2019/059844, dated Sep. 12, 2019, WIPO, 3 pages.

* cited by examiner

METHOD FOR ARRANGING FUNCTIONAL ELEMENTS IN A ROOM

CROSS-REFERENCE TO RELATED APPLICATIONS

The present application is a U.S. National Phase of International Patent Application Serial No. PCT/EP2019/059844 entitled "METHOD FOR ARRANGING FUNCTIONAL ELEMENTS IN A ROOM," filed on Apr. 16, 2019. International Patent Application Serial No. PCT/EP2019/059844 claims priority to German Patent Application No. 10 2018 108 991.0 filed on Apr. 16, 2018. The entire contents of each of the above-referenced applications are hereby incorporated by reference for all purposes.

TECHNICAL FIELD

The present invention relates to a method of arranging one or more functional elements in a room.

BACKGROUND AND SUMMARY

There are known from the prior art pieces of furniture for the kitchen area from individual carcass elements that are assembled in a manner desired by the user, e.g. to form a kitchen unit having wall units and floor units, etc. whose dimensions are coordinated such that they correspond to the available dimensions of the room or fall below them. Such an arrangement is admittedly functional, but not very flexible since there are comparatively few variation possibilities after the installation of the kitchen and even already in the planning phase.

It is the underlying object of the present invention to provide a possibility by which functional elements such as shelves, preparation surfaces, seating possibilities, and also three-dimensional carcasses (volumes) such as cupboards, appliances, etc. can be arranged or provided variably with great variability and flexibility with a comparatively small effort.

This object is achieved by a method having the features of claim 1.

Provision is accordingly made that the method comprises the following steps:
a) three-dimensional acquisition of the room or of part of the room by means of a scanner;
b) definition of a grid of the room based on the acquisition in accordance with step a);
c) definition of grid points of the room in the grid prepared in accordance with step b);
d) definition of at least one grid point of one or more functional elements to be arranged in the room; and
e) virtual arrangement of the functional element or elements in the room at a point at which at least one grid point of the room and at least one grid point of the functional element or elements coincide.

In a first step, the room or a part thereof, such as a specific side or corner in which the functional element or elements is/are to be arranged, are acquired in three dimensions.

This can be done, for example, by a 3D scanner.

Based on this image detection, a grid is placed over this image and points are defined in the grid (also called room grid points in the following) that are disposed on the lines of the grid and are, for example, disposed on the intersection points of two lines of the grid.

These room grid points form the starting points or zero points starting from which a coordinate system or an arrangement system is virtually spanned in which the functional element or elements is/are arranged.

In a further step, one or more grid points, that are also called product grid points in the following, are assigned to the at least one functional element itself that is to be arranged in the room. They can, for example, be disposed at edges and/or corners of the carcass of the functional element, but also at any other desired point of the functional element.

The grids of the functional element and/or of the room preferably consist of or comprise a plurality of lines that preferably intersect and that have a predefined spacing from one another in the form of the grid dimension.

Finally, the functional element or elements is/are arranged in the room such that the grid points of the room (room grid points) at least partially coincide with those of the functional element or elements (product grid points). The functional elements are thus arranged at these coinciding points with reference to the grid spanning the room, with the user being largely free in the manner of the arrangement (arrangement in the room, orientation, etc.).

The grid of the room thus represents an arrangement system with reference to which the arrangement of the functional element or elements takes place in a variable manner since the product or functional element can be arranged at different positions along the room grid.

In accordance with the invention, a point model is thus created in which, with respect to the room grid and the product grid, there is an unambiguous association in relationship to and between one another. Each point of the room grid is in an unambiguous association with another point of the room grid and also in an unambiguous association with the product grid.

Each point of the room grid can serve as the starting point for the arrangement of a functional element such as a furniture element or an appliance, or the like. The points and thus also the functional elements arranged thereat are unambiguously arranged in the room.

A cut set is preferably formed from the grid points of the room and the grid points of the functional element or elements. Provision is made in this case that only those intersection points, i.e. the coinciding points of the room grid and of the product grid, are used to position the functional element or elements.

The cut set of the grid points of the room and the grid points of the functional element or elements can thus form the zero point for the further planning of the room so that a precise arrangement of any desired elements is possible at exactly the desired position in the room.

The grid dimension of the grid spanning the room is preferably formed in dependence on the dimension(s) of the functional element or elements. If the functional element, for example, has a width or depth or height of 80 cm, it is advantageous for the grid dimension of the room, i.e. e.g. the spacing of two parallel lines of the grid from one another, to likewise have a grid having this value or to be a whole number multiple (such as 1.6 m) or a whole number divisor (such as 40 cm) of this value.

It is thus conceivable by way of example in an embodiment of the invention for the grid dimension of the room to be a whole number multiple or divisor of the dimension(s) of the functional element or elements.

It is preferred if the grid point or points of the functional element or elements is/are disposed at one or more corners or edges of the functional element.

It is equally possible that the grid point or points of the functional element or elements is/are disposed within the functional element, e.g. in a groove or the like of the functional element.

The functional element is preferably a furniture element, e.g. from the living or kitchen area, and in particular a kitchen furniture element or another functional element from the kitchen area such as an extractor fan, etc.

It is also conceivable that the functional element is a table, a board, a work surface, a sink, a floor unit, a wall unit, a furniture island, and/or a technical appliance such as an oven, etc. This is an exemplary list which does not restrict the invention.

It is pointed out at this point that the terms "a" and "one" do not necessarily refer to exactly one of the elements, even though this represents a possible embodiment, but can also designate a plurality of elements. The use of the plural equally also includes the presence of the element in question in the singular and, conversely, the singular also includes a plurality of the elements in question.

BRIEF DESCRIPTION OF THE FIGURES

Further details and advantages of the invention will be explained in more detail with reference to an embodiment shown in the drawing.

There are shown.

DETAILED DESCRIPTION

The method begins with the measurement of a room by means of a 3D scanner and with the subsequent assignment of a grid (also called a room grid in the following) j to the room to be measured. The kind of scanner is arbitrary. What is important is its ability to measure the room or a part of the room and to provide it with a grid that the user sees on his screen.

It is conceivable in principle that the total room is provided with the same grid dimension. It is, however, also conceivable that e.g. ceilings and floors are provided with the same grid dimension, but one or more walls with a grid differing therefrom.

Figure 1:
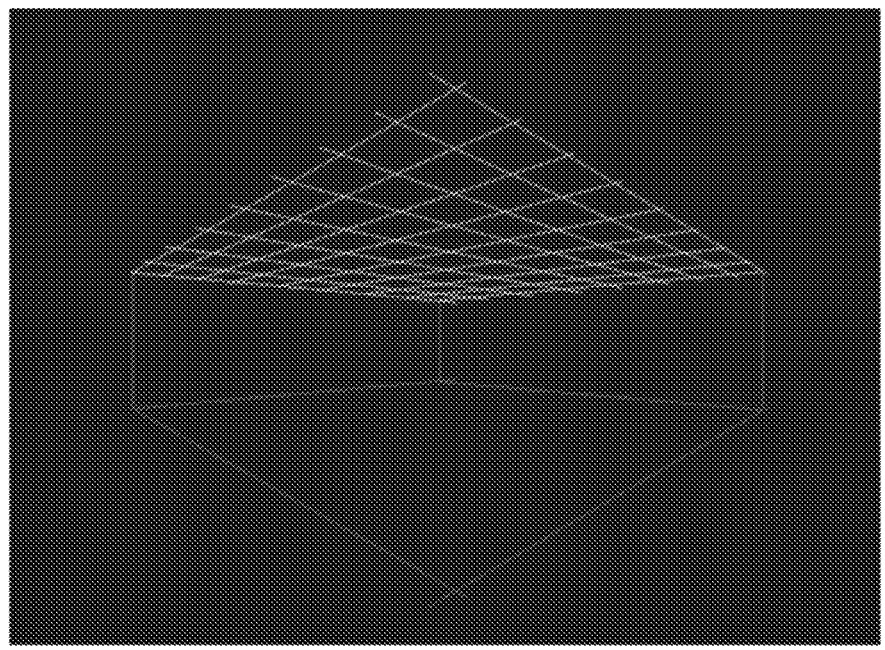
FIG. 1: a view of the room in a 3D representation with a grid at the room ceiling.

FIG. 1 shows the arrangement of a grid at the ceiling of the measured room in the screen view that is provided to the user.

Figure 2:
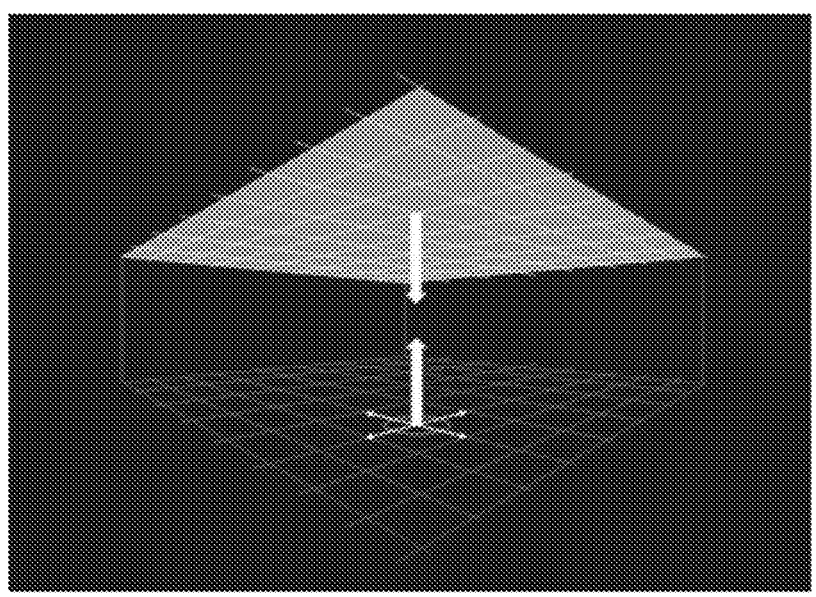
FIG. 2: a view of the room in a 3D representation with a grid at the room ceiling and at the room floor.

The grid can, for example, consist of lines intersecting at a right angle, as can be seen from FIG. 1 and also from FIG. 2, in which the floor is also provided with a grid.

The grids of the floor and of the ceiling recognizable on the screen in accordance with FIG. 2 are congruent, i.e. they are aligned with one another in the plan view. This becomes clear by the arrows directed toward one another.

The arrows arranged at floor level and facing in different directions illustrate that the functional element not shown in FIGS. 1 and 2 can be moved e.g. in these directions, as required. The movement does not take place constantly in this process, i.e. not continuously, but rather incrementally from one line of the grid to the next.

Figure 3:
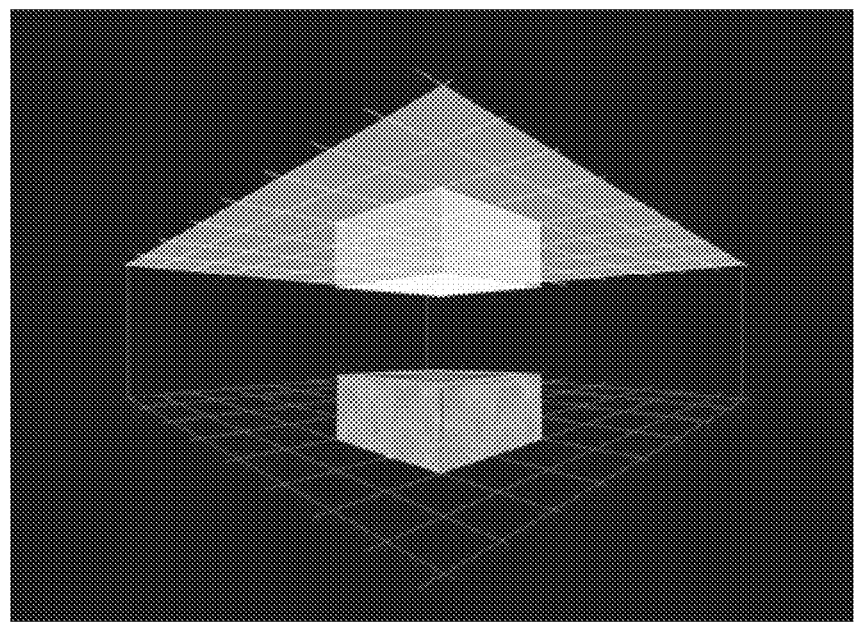
FIG. 3: the arrangement of a functional element in the room in accordance with FIG. 2.

FIG. 3 shows the state in which a functional element such as a furniture island, i.e. a free-standing furniture element with or without functional elements such as a sink, an extractor, etc., is initially aligned at the grid at the ceiling side and is then arranged downwardly, i.e. at the floor. The alignment is made here such that grid points of the functional element (also called product grid points in the following) coincide with those of the room grid. The product is thus e.g. positioned such that an edge of the product is disposed on a line of the room grid, etc.

Figure 4:
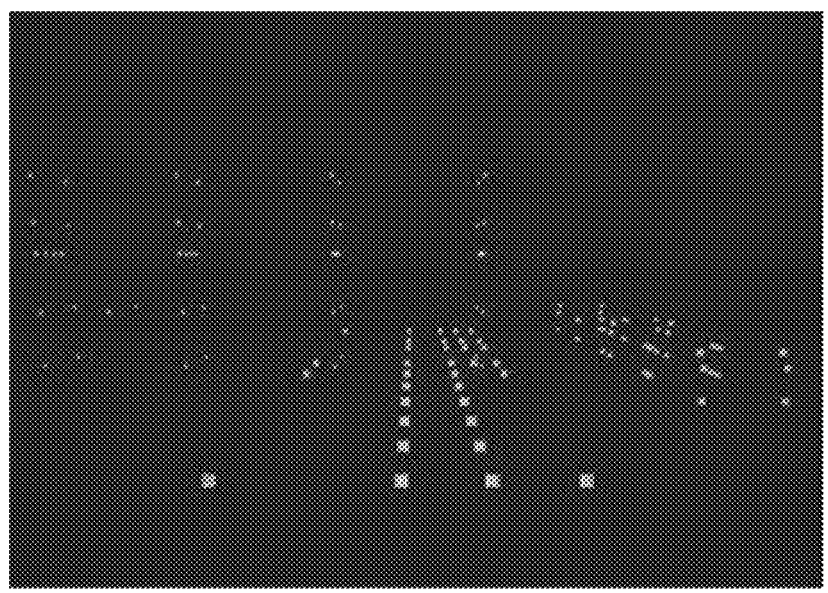
FIGS. 4, 5: views of points that are both components of the room and components of a functional element.

As can further be seen from FIG. 3, the grid dimension of the room grid is selected such that it represents a whole number fraction of the product grid. In FIG. 4, the divisor amounts to 2, i.e. the edge length of the product amounts to twice the spacing of two lines of the room grid.

Figure 5:
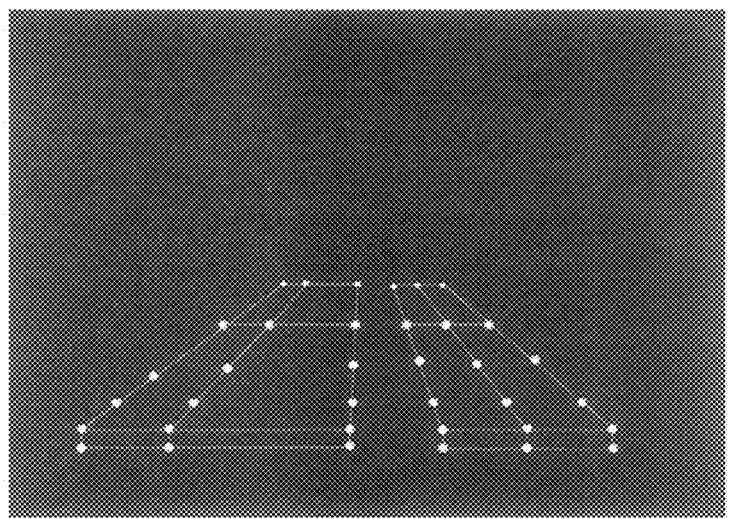

FIG. 4 shows a further example of a point family that consists of points that form both components of the room grid and those of the product grid. This applies to the point family shown in FIG. 5 that correspondingly serves the arrangement of work surfaces or tables.

Figure 6:
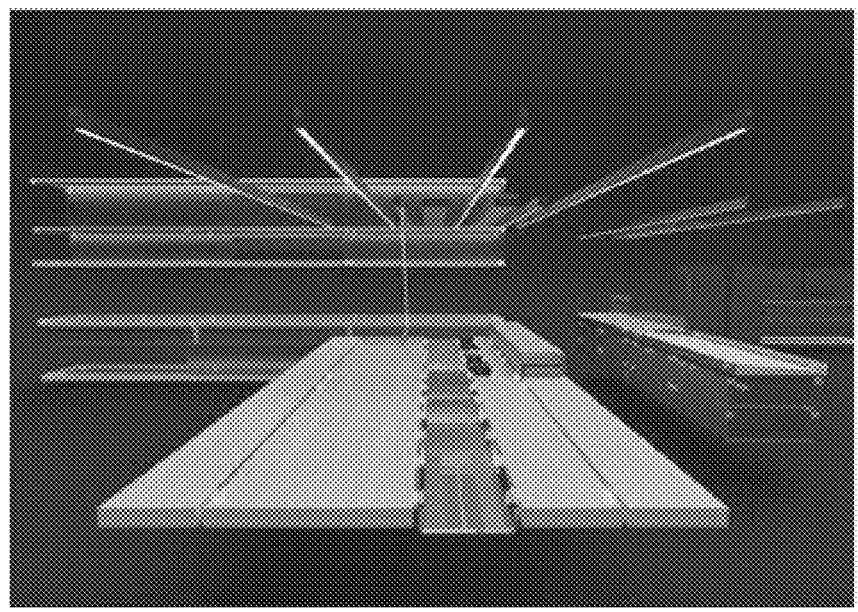
FIG. 6: a view of a room with the points in accordance with FIGS. 4, 5 and with work surfaces and boards added therein.

One or more table tops and furthermore boards arranged at the wall are then added to this grid in accordance with FIG. 6.

Figure 7:
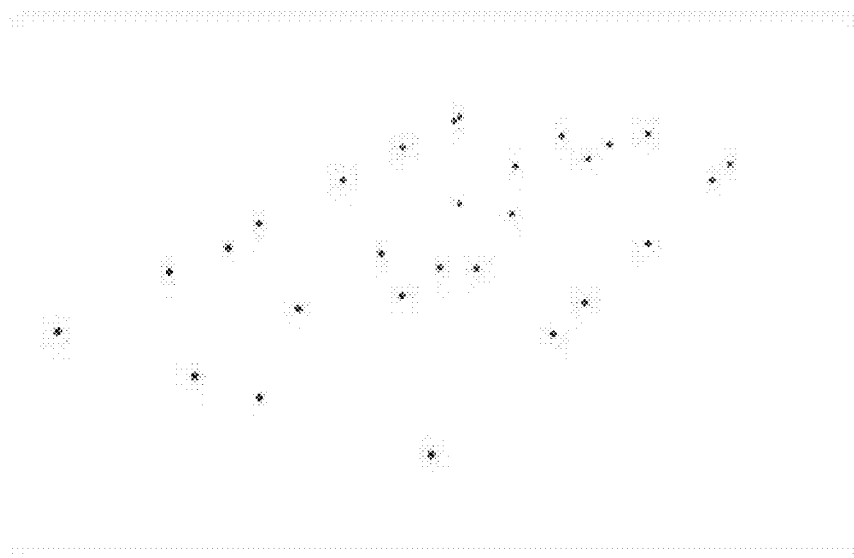
FIG. 7: views of further points that are both components of the room and components of a functional element.
Figure 8:
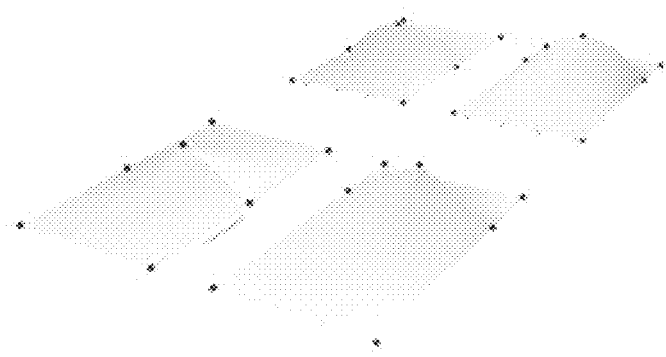
FIG. 8: a view of the arrangement in accordance with FIG. 7 with functional elements added therein.
Figure 9:
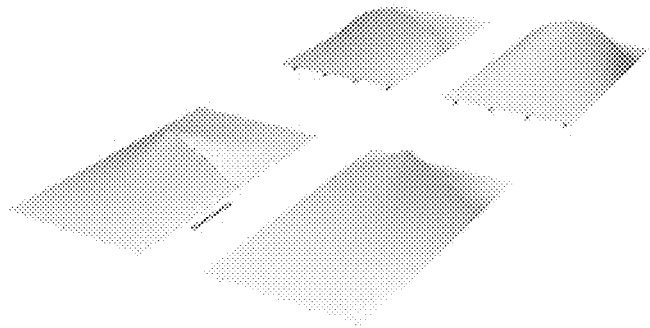
FIG. 9: a view of the arrangement in accordance with FIG. 7 with functional elements added therein without grid points.

FIG. 7 shows a further example of points that form both components of the room grid and those of the product grid. Four products shown schematically which can be any desired functional elements have been added to this point set in FIGS. 8 and 9.

The invention claimed is:

1. A method of arranging one or more functional elements in a room, comprising the steps:
    a) three-dimensional acquisition of the room or of part of the room by means of a scanner;
    b) definition of a grid of the room based on the acquisition in accordance with step a);
    c) definition of grid points of the room in the grid prepared in accordance with step b), wherein the grid points of the room are overlaid onto the grid of the room;
    d) definition of at least one grid point of one or more functional elements, wherein the at least one grid point of the one or more functional elements is overlaid onto the one or more functional elements; and
    e) virtual arrangement of a functional element or elements in the room at at least one point at which at least one grid point of the room and at least one grid point of the functional element coincide,
       wherein a cut set is formed from the grid points of the room and the grid points of the functional element or elements, and
       wherein the cut set of the grid points of the room and the grid points of the functional element or the elements each form a zero point for a further planning of the room so that a precise arrangement of any desired elements is possible at exactly the desired position in the room.

2. The method in accordance with claim 1, wherein a grid dimension of the room is formed in dependence on dimension(s) of the functional element or elements, and wherein the grid dimension of the room is a whole number multiple or a whole number divisor of the dimension(s) of the functional element or elements.

3. The method in accordance with claim 1, wherein the grid point or points of the functional element or elements is/are disposed at one or more corners or edges of the functional element.

4. The method in accordance with claim 1, wherein the grid point or points of the functional element or elements is/are disposed within the functional element.

5. The method in accordance with claim 4, wherein the functional element is a groove.

6. The method in accordance with claim 1, wherein the functional element is a furniture element.

7. The method in accordance with claim 1, wherein the functional element is a furniture element or a functional element of a kitchen or of a living room or of a bathroom or of another room.

8. The method in accordance with claim 1, wherein the functional element is a table, a board, a work surface, a sink, a floor unit, a wall unit, a furniture island, and/or a technical appliance.

9. The method in accordance with claim 8, wherein the technical appliance is an oven.

10. The method in accordance with claim 1, wherein the at least one grid point of the room is disposed on lines of the grid.

11. The method in accordance with claim 10, wherein only the coinciding points of the grid of the room and of a product grid of the functional element or elements are used to position the functional element or elements.

12. The method in accordance with claim 11, wherein a grid dimension for the grid of the room is based on a product grid of the functional element or elements.

13. The method in accordance with claim 1, wherein a grid dimension for the grid of the room is selected to be a whole number divisor of dimension(s) of the functional element or elements.

14. The method in accordance with claim 1, wherein movement of the functional element or elements is not continuous during the virtual arrangement but rather incremental from one line of the grid of the room to the next.

15. The method in accordance with claim 1, wherein the at least one grid point of the one or more functional elements includes one or more grid points in between corners of the one or more functional elements.

16. A method of arranging one or more functional elements in a room, comprising the steps:
    a) three-dimensional acquisition of the room or of part of the room by means of a scanner;
    b) definition of a grid of the room based on the acquisition in accordance with step a);
    c) definition of grid points of the room in the grid prepared in accordance with step b), wherein the grid points of the room are overlaid onto the grid of the room;
    d) definition of at least one grid point of one or more functional elements, wherein the at least one grid point of the one or more functional elements is overlaid onto the one or more functional elements; and
    e) virtual arrangement of a functional element or elements in the room at at least one point at which at least one grid point of the room and at least one grid point of the functional element coincide,
    wherein the at least one grid point of the room is disposed on lines of the grid,
    wherein only the coinciding points of the grid of the room and of a product grid of the functional element or elements are used to position the functional element or elements, and
    wherein a grid dimension for the grid of the room is based on a product grid of the functional element or elements.

* * * * *